United States Patent
Hsu et al.

(10) Patent No.: US 8,978,206 B2
(45) Date of Patent: Mar. 17, 2015

(54) DUAL-SHAFT SYNCHRONOUS MOTION DEVICE

(71) Applicant: First Dome Corporation, New Taipei (TW)

(72) Inventors: An Szu Hsu, New Taipei (TW); Ya Ching Lin, New Taipei (TW)

(73) Assignee: First Dome Corporation, New Taipei (TW)

( * ) Notice: Subject to any disclaimer, the term of this patent is extended or adjusted under 35 U.S.C. 154(b) by 125 days.

(21) Appl. No.: 13/895,435

(22) Filed: May 16, 2013

(65) Prior Publication Data

US 2014/0338482 A1   Nov. 20, 2014

(51) Int. Cl.
| | | |
|---|---|---|
| *G06F 1/16* | (2006.01) | |
| *E05D 3/06* | (2006.01) | |
| *F16H 19/08* | (2006.01) | |
| *E05D 7/00* | (2006.01) | |

(52) U.S. Cl.
CPC ............. *F16H 19/08* (2013.01); *G06F 1/1681* (2013.01); *E05D 3/06* (2013.01); *E05D 7/00* (2013.01); *G06F 1/1618* (2013.01)
USPC ................... 16/302; 16/366; 16/227

(58) Field of Classification Search
CPC ........... E05D 7/00; E05D 3/06; G06F 1/1681; G06F 1/1618; F16H 19/08
USPC .......... 16/302, 354, 366, 365, 368, 369, 370, 16/342, 227; 361/679.08, 679.11, 679.02, 361/679.15, 679.27; 455/90.3, 575.1, 455/575.3, 575.8; 379/433.12, 433.13; 348/373, 333.01, 333.06, 794
See application file for complete search history.

(56) References Cited

U.S. PATENT DOCUMENTS

| | | | | |
|---|---|---|---|---|
| 4,619,304 | A * | 10/1986 | Smith ............................. | 16/227 |
| 8,151,414 | B2 * | 4/2012 | Baudasse et al. ............... | 16/227 |
| 2006/0236505 | A1 * | 10/2006 | Maatta et al. ................... | 16/366 |
| 2007/0084016 | A1 * | 4/2007 | Bommelmann et al. ........ | 16/366 |
| 2009/0282650 | A1 * | 11/2009 | Jin et al. ......................... | 16/367 |
| 2010/0024169 | A1 * | 2/2010 | Self ................................. | 16/354 |

* cited by examiner

*Primary Examiner* — Jeffrey O Brien
(74) *Attorney, Agent, or Firm* — Rosenberg, Klein & Lee

(57) ABSTRACT

A dual-shaft synchronous motion device includes a first shaft and a second shaft; a first rotor disposed on the first shaft and turned synchronously; a second rotor disposed on the second shaft and turned synchronously; and a tractive member disposed between the first rotor and the second rotor. When the first shaft drives the first rotor to turn, the tractive member brings the second rotor to turn reversely relative to the first rotor so that the first and second shafts are turned synchronously.

32 Claims, 6 Drawing Sheets

DUAL-SHAFT SYNCHRONOUS MOTION DEVICE

BACKGROUND OF THE INVENTION

1. Field of the Invention

The present invention relates to a dual-shaft synchronous motion device, and more particularly to a pivot shaft in cooperation with rotors and a tractive member so that first and second shafts are turned synchronously.

2. Description of the Prior Art

A pivot or a turning shaft which can be turned back and forth by applying an external force is widely used to en electronic article, such as a cell phone, a notebook, a PDA, a digital camera, an electronic book and the like, so that its cover, display screen, or a watch window can be turned to open/close. For example, Taiwan Patent No. 97222022 discloses a turning shaft structure; Taiwan Patent No. 96217011 discloses a pivot positioning structure; and Taiwan Patent No. 98207366 discloses a pivot structure.

For the display module (such as, a screen) and/or the machine body module of the electronic article to provide more operation modes and applied range, the prior art also discloses a dual shaft disposed between the display module and the machine body module. For example, Taiwan Patent No. 96148572 discloses a super-wide angle dual turning shaft structure; Taiwan Patent No. 99211350 discloses a dual pivot hinge.

Regarding the operation, motion and configuration of the prior art, the pivot or turning shaft assembly usually includes a plurality of through holes, concave and convex spacers for positioning, friction plates and springs which are assembled to the turning shafts. Two ends of the turning shaft are respectively positioned by buckles or fixtures. The turning shaft or pivot assembly is turned and positioned by the springs to store and release energy.

The prior art also discloses a dual-shaft device. A first shaft and a second shaft are respectively provided with a cam which is driven by the first and second shafts. A movable latch is provided between the two cams of the first and second shafts. When the first shaft is turned, the cam of the first shaft will push the latch to block the cam of the second shaft so that the second shaft cannot be turned. After the first shaft is turned 180 degrees, the second shaft can be turned with its cam to push the latch to block the cam of the first shaft.

The first and second shafts of the aforesaid structure cannot be turned synchronously. After the first shaft is turned to be positioned, the second shaft can be operated accordingly. When the cam is turned to push the latch to block another cam, there is a noise. When the first and second shafts are turned to be positioned, a block of the cam is against a positioning portion of the dual-shaft device. Thus, during operation, there will be a collision between the parts when positioned or it will be stopped by the positioning portion. These situations are not expected.

Typically, if the configuration of the turning shaft and the related parts can be changed, it will be used widely and convenient for assembly.

According to the aforesaid, the topics to consider the design of configuration and the techniques are as follows:

1. Providing a synchronous motion device disposed between the display module and the machine body modules. When the display module is turned 0-180 degrees, the machine body module will be relatively turned 0-180 degrees. The total turning angle of the display module and the machine body module can achieve 360 degrees. Under the condition that the electronic product has various operation modes (or applied range), it provides an easy and convenient operation effect.

2. The synchronous motion device should remove the through holes, the concave and convex spacers for positioning, the friction plates and the springs. The turning shaft or pivot assembly is turned and positioned by the springs to store and release energy. The aforesaid patents don't teach or disclose these topics.

Accordingly, the inventor of the present invention has devoted himself based on his many years of practical experiences to solve these problems.

SUMMARY OF THE INVENTION

The primary object of the present invention is to provide a dual-shaft synchronous motion device. The dual-shaft synchronous motion device includes a first shaft and a second shaft; a first rotor disposed on the first shaft and turned synchronously; a second rotor disposed on the second shaft and turned synchronously; and a tractive member disposed between the first rotor and the second rotor. When the first shaft drives the first rotor to turn, the tractive member brings the second rotor to turn reversely relative to the first rotor so that the first and second shafts are turned synchronously.

The tractive member is in the form a (flexible) wire and has a first end and a second end. The first and second ends of the tractive member are respectively wound and secured to the first rotor and the second rotor. The first and second ends of the tractive member each have a fixing section so that the first and second ends of the tractive member are respectively secured to the first rotor and the second rotor.

The first and second rotors each have an accommodation room to receive the fixing section. In detail, the first and second rotors comprise main portions and secondary portions to mate with each other. The main portions and the secondary portions each have a groove to define the accommodation room when the main portions and the secondary portions are assembled together to form the first rotor and the second rotor.

The first and second rotors cooperate with the configuration of the tractive member so the torsion change of turning is decreased to the least for the first and second shafts to have a smooth turning. Besides, when the operator stops the operation of turning, the first and second shafts immediately stops turning to form a positioning effect.

DETAILED DESCRIPTION OF THE PREFERRED EMBODIMENTS

Embodiments of the present invention will now be described, by way of example only, with reference to the accompanying drawings.

Figure 1:
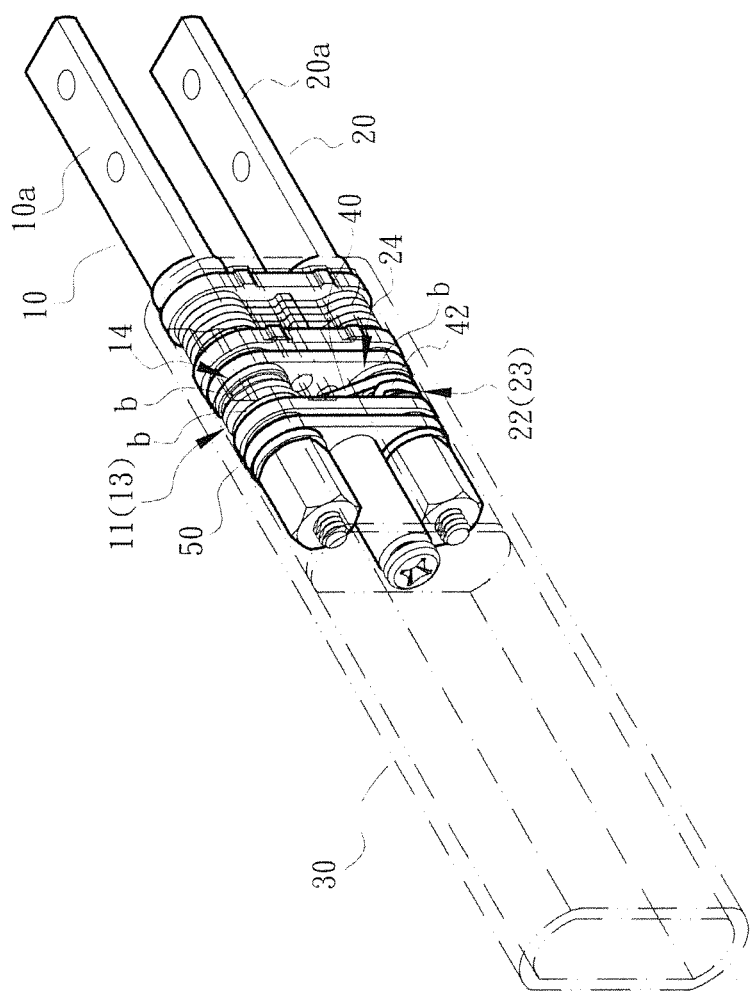
FIG. 1 is a perspective view showing the first and second shafts, the first and second rotors and the tractive member of the present invention.
Figure 2:
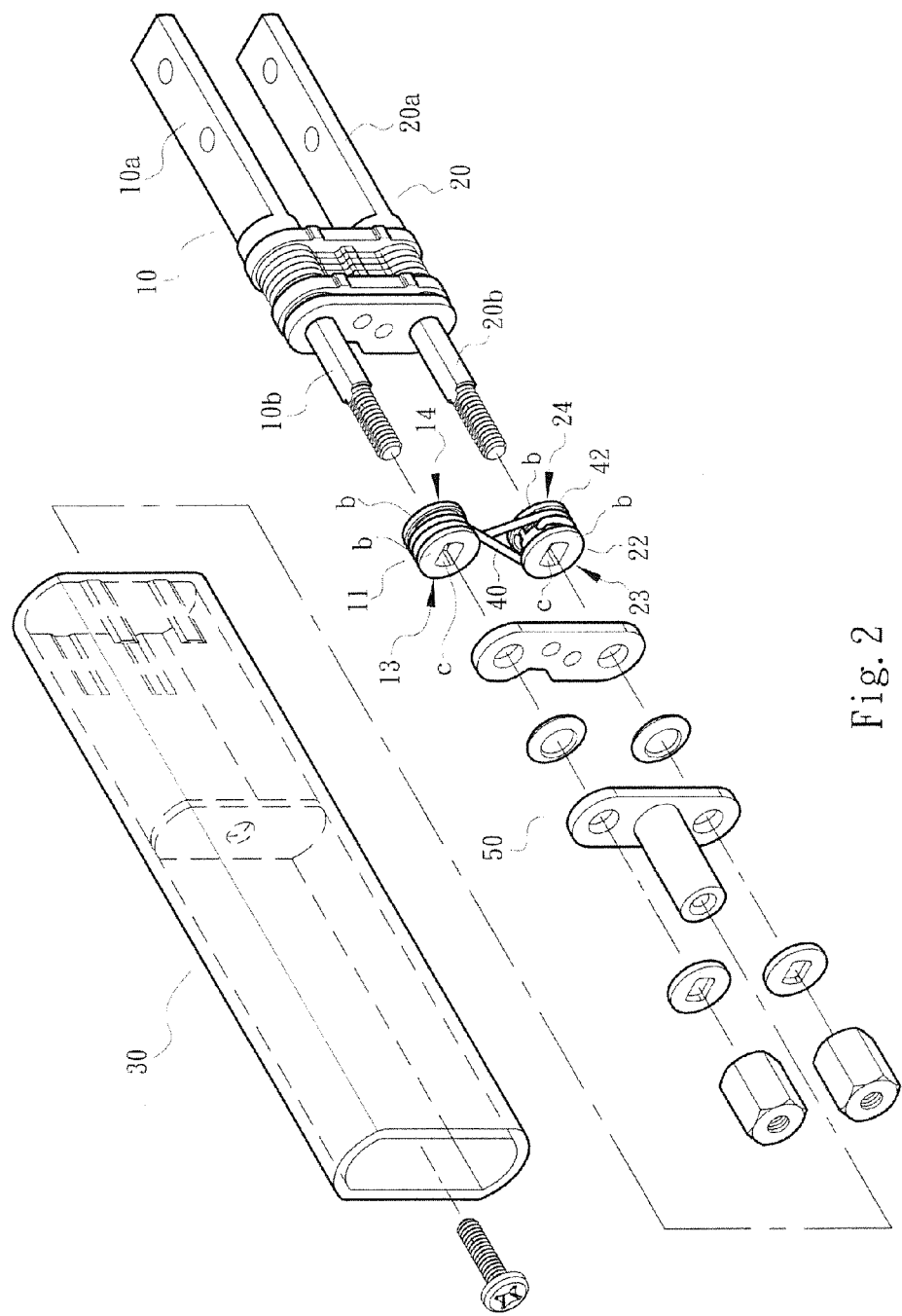
FIG. 2 is an exploded view of the present invention.
Figure 3:
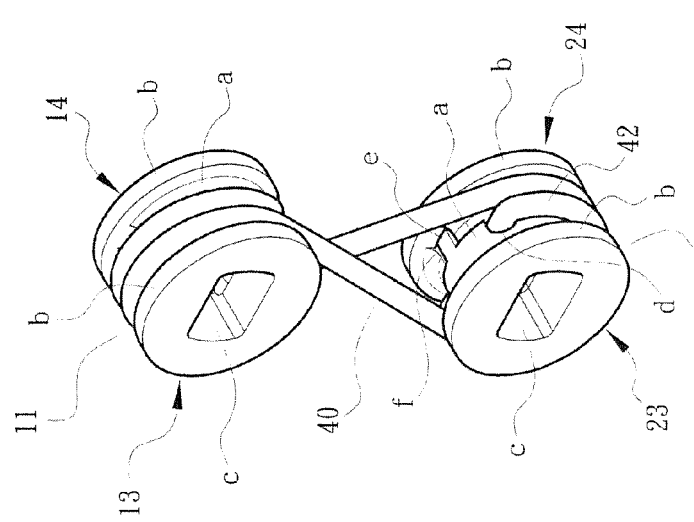
FIG. 3 is a perspective view of the first and second rotors and the tractive member of the present invention.
Figure 5:
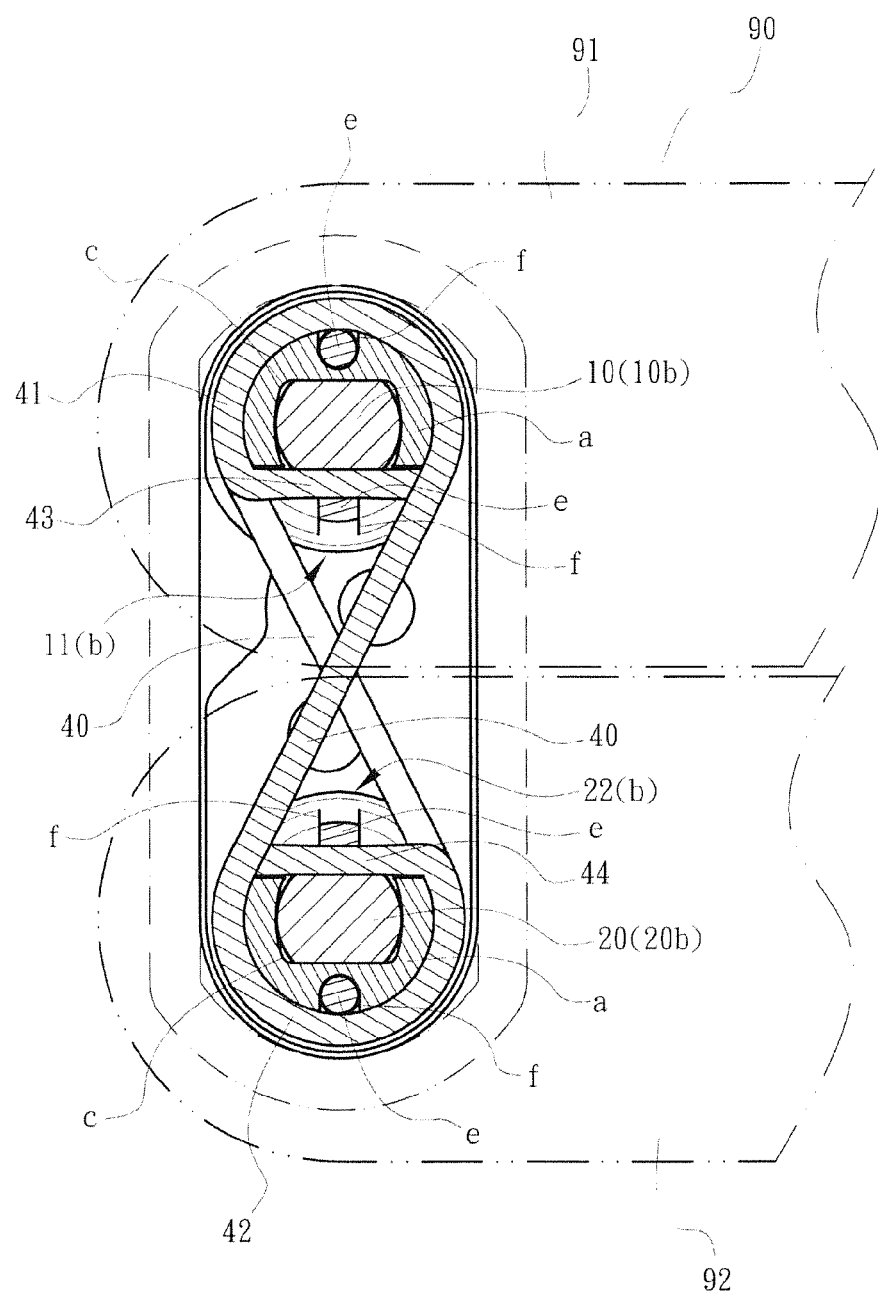
FIG. 5 is a sectional view of FIG. 3, wherein the broken lines show the position of the display module and the machine body module.

As shown in FIG. 1, FIG. 2 and FIG. 3, the dual-shaft synchronous motion device of the present invention comprises a first shaft 10 and a second shaft 20. The first shaft 10 and the second shaft 20 are mounted in a casing 30. The first and second shafts 10, 20 respectively have a fixed end 10a, 20a and a pivot end 10b, 20b. The fixed ends 10a, 20a cooperate with a fixed seat (not shown in the drawings), so that the first and second shafts 10, 20 are fixed to a display module 91 and a machine body module 92 of an electronic article 90 (as shown in FIG. 5), such as a cell phone, a computer or the like.

As shown in FIG. 1, FIG. 2 and FIG. 3, the pivot end 10b of the first shaft 10 synchronously drives a first rotor 11 which is directly mounted on the pivot end 10b or indirectly drives the pivot end 10b. The pivot end 20b of the second shaft 20 synchronously drives a second rotor 22 which is directly mounted on the pivot end 20b or indirectly drives the pivot end 20b. A tractive member 40 is provided between the first and second rotors 11, 22. The first and second rotors 11, 22 and the tractive member 40 in cooperation with a fixture assembly 50 are assembled on the first shaft 10 and the second shaft 20.

Figure 4:
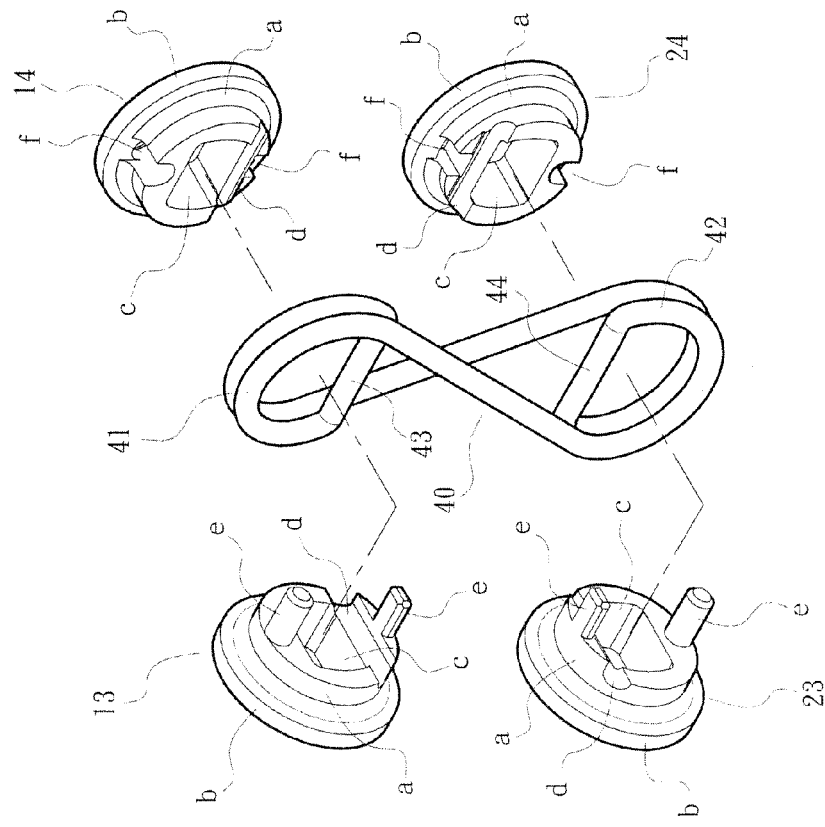
FIG. 4 is an exploded view of FIG. 3 to show the winding state of the first and second ends of the tractive member.

Referring to FIG. 3 and FIG. 4, in an embodiment, the first and second rotors 11, 22 are in the form of a roller, and comprise main portions 13, 23 and secondary portions 14, 24 to mate with each other. The main portions 13, 23 and the secondary portions 14, 24 each have a cylindrical main body a and a shoulder portion b connected with the main body a. The width (or diameter) of the main body a is less than that of the shoulder portion b.

As shown in the drawings, the main portions 13, 23 and the secondary portions 14, 24 each have a shaft hole c. The shaft hole c corresponds in shape to the cross-section of the pivot ends 10b, 20b of the first and second shafts 10, 20. For example, the pivot ends 10b, 20b of the first and second shafts 10, 20 and the shaft hole c have a rectangular cross-section, as shown in the drawings, so that the pivot hole c is pivoted to the pivot ends 10b, 20b of the first and second shafts 10, 20. The first rotor 11 and the first shaft 10 are turned together. The second rotor 22 and the second shaft 20 are turned together. The main portions 13, 23 and the secondary portions 14, 24 each have a groove d to define an accommodation room for accommodating and positioning the tractive member 40 when the main portions 13, 23 and the secondary portions 14, 24 are assembled together to form the first rotor 11 and the second rotor 22.

As shown in FIG. 4, in this embodiment, the main portions 13, 23 each have a plug e, and the secondary portions 14, 24 each have a cavity f corresponding in position to the plug e to receive the plug e, so that the main portions 13, 23 and the secondary portions 14, 24 are assembled to form the first rotor 11 and the second rotor 22. The arrangement of the plugs e of the main portions 13, 23 and the cavities f of the secondary portions 14, 24 can be changed and modified.

Referring to FIG. 3 and FIG. 4, the tractive member 40 is in the form a (flexible) wire, and has a first end 41 and a second end 42. The first end 41 of the tractive member 40 is wound and secured to the main body a of the first rotor 11, and the second end 42 of the tractive member 40 is wound and secured to the main body a of the second rotor 22.

In this embodiment, the first and second ends 41, 42 of the tractive member 40 respectively have fixing sections 43, 44. The fixing sections 43, 44 are in the form of a linear section to be received and positioned in the accommodation rooms defined by the grooves d of the main portions 13, 23 and the secondary portions 14, 24 so that the tractive member 40 (the first and second ends 41, 42) is secured to the first rotor 11 and the second rotor 22.

Referring to FIG. 3, FIG. 4 and FIG. 5, the tractive member 40 disposed on the first and second rotors 11, 22 has a 8-like shape. For example, as shown in the drawings, the tractive member 40 (or the first end 41) is wound from the right of the first rotor 11 to the left of the second rotor 22, and then the tractive member 40 (or the second end 42) is wound back from the right of the second rotor 22 to the left of the first rotor 11. This arrangement makes the first shaft 10 and the second shaft 20 turn in different directions.

Referring to FIG. 5, the display module 91 is closed on the machine body module 92, and the inclined angle of both is defined as 0 degree. When the operator opens the display module 91 for the first shaft 10 to bring the first rotor 11 to turn counterclockwise as shown in the drawings, the tractive member 40 pulls the second rotor 22 and forces the second rotor 20 to turn reversely (namely, to turn clockwise) relative to the turning direction of the first rotor 11 so that the first and second shafts 10, 20 can turn synchronously.

Figure 6:
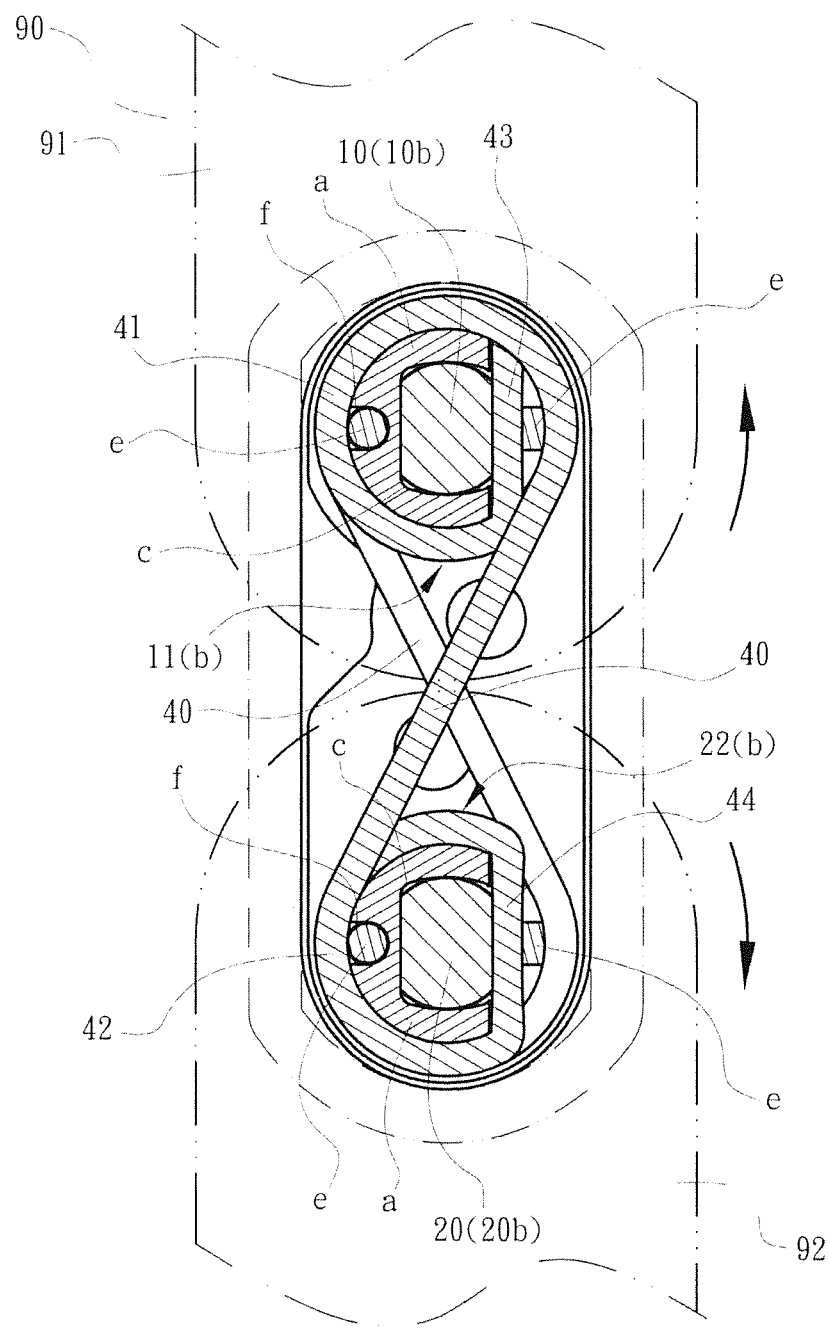
FIG. 6 is a schematic view of the present invention in an operating state that the display module and the machine body module are turned 90 degrees and the first and second shafts and the first and second rotors are driven to turn.
Figure 7:
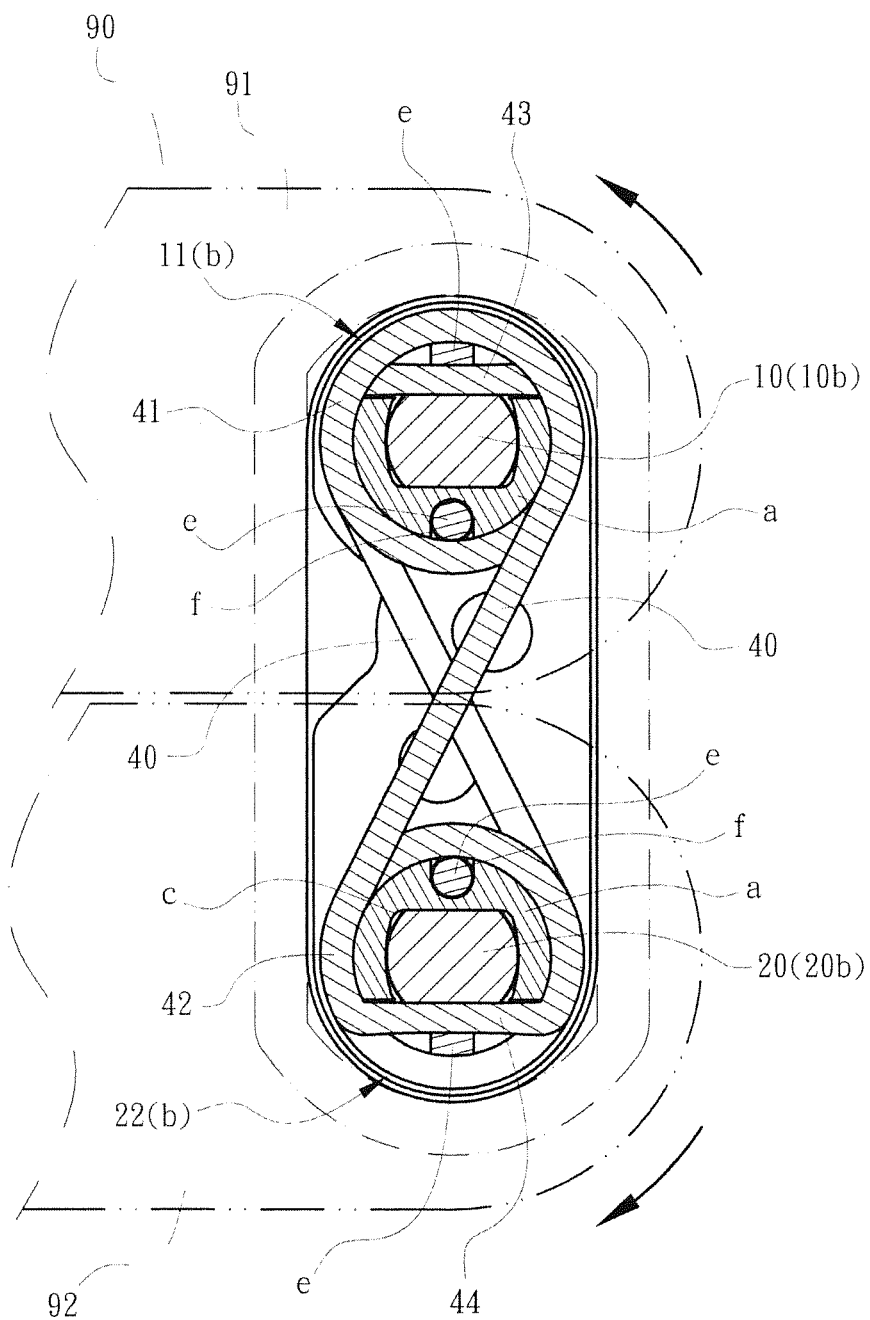
FIG. 7 is a schematic view of the present invention in an operating state that the display module and the machine body module are turned 180 degrees and the first and second shafts and the first and second rotors are driven to turn.

As shown in FIG. 6, when the operator opens the display module 91 to turn the first shaft 10 counterclockwise to the position of 90 degrees as shown in the drawings, the first and second rotors 11, 22 cooperate with the transmission of the tractive members 4 and the second shaft 20 and the machine body module 92 are synchronously turned clockwise to the position of the 90 degrees, namely, the display module 91 and the machine body module 92 are turned 180 degrees. As shown in FIG. 7, when the operator opens the display module 91 to turn the first shaft 10 counterclockwise to the position of 180 degrees as shown in the drawings, the machine body module 92 is synchronously turned clockwise to the position of the 180 degrees, namely, the display module 91 and the machine body module 92 are turned 360 degrees.

That is, the synchronous motion device makes the user operate the display module 91 to turn an angle or range to get a double route of that turning angle or range, providing a quick operation effect.

In a preferable embodiment, after the first rotor 11 is turned 180 degrees along with the first shaft 10, the length of the tractive member 40 (or the first end 41), wound on the first rotor 11, is at least equal to or greater than a half of the periphery of the first rotor 11, or the length of the second end 42 of the tractive member 40, wound on the second rotor 22, is at least equal to or greater than a half of the periphery of the second rotor 22.

It is noted that the tractive member 40 is tightly wound on the first and second rotors 11, 22 so the torsion change of turning is decreased to the least for the first and second shafts 10, 20 to have a smooth turning. Besides, when the operator stops the operation of turning, the first and second shafts 10, 20 immediately stops turning to form a positioning effect.

Typically, compared to the prior art, the dual-shaft synchronous motion device of the present invention has the following advantages.

1. The assembly of the shafts (including the first shaft 10 and the second shaft 20) and the corresponding parts (such as the first rotor 11 and the second rotor 22 in cooperation with the assembly of the main portions 13, 14 and the secondary portions 23, 24, the grooves d to define the accommodation rooms to retain the fixing sections 43, 44 of the tractive member 40, the arrangement of the tractive member 40 wound on the first and second rotors 11, 22) constitute a synchronous motion mechanism. This is different from the configuration to store and release energy by using multiple spacers, friction plates in cooperation with springs of the prior art.

2. The transmission structure of the first rotor 11 and the second rotor 22 in cooperation with the tractive member 40 provides a synchronous motion device mounted between the display module 91 and the machine body module 92. This allows that when the operator only operates the display module 91 to turn 0-180 degrees, the machine body module 92 will synchronously turn 0-180 degrees so that the total turning angle of the display module 91 and the machine body module 92 can achieve 360 degrees. That is to say, the synchronous motion device makes the user operate the display module 91 to turn an angle or range to get a double route of that turning angle or range. Under the condition that the electronic product 90 has various operation modes, the present invention provides an easy and convenient operation effect.

The prior art only allows the user to respectively operate the first shaft and the second shaft. After the first shaft is turned to be positioned, the second shaft can be turned accordingly. During operation, there is a noise and the parts may collide with each other to stop. The present invention improves these shortcomings greatly.

Accordingly, the present invention provides an effective dual-shaft synchronous motion device which has a different configuration from the prior art.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A dual-shaft synchronous motion device, comprising:
a first shaft driving a first rotor synchronously and a second shaft driving a second rotor synchronously, the first rotor and the second rotor respectively having a cylindrical main body; and
a tractive member connected between the first rotor and the second rotor, the first rotor and the second rotor being turned synchronously;
wherein the first rotor and the second rotor are in the form of a roller and comprise main portions and secondary portions to mate with each other;
wherein the main portions and the secondary portions each have a groove to define an accommodation room for accommodating and positioning the tractive member when the main portions and the secondary portions are assembled together to form the first rotor and the second rotor.

2. The dual-shaft synchronous motion device as claimed in claim 1, wherein the first rotor is directly mounted on the first shaft; the second rotor is directly mounted on the second shaft; the first shaft and the second shaft respectively have a fixed end and a pivot end; when the first shaft drives the first rotor to turn, the tractive member brings the second rotor to turn reversely relative to the first rotor so that the first and second shafts are turned synchronously.

3. The dual-shaft synchronous motion device as claimed in claim 1, wherein the first rotor and the second rotor assembled by the first portions and the secondary portions each have a shoulder portion and a shaft hole for insertion of the first shaft and the second shaft.

4. The dual-shaft synchronous motion device as claimed in claim 3, wherein the main body has a width less than that of the shoulder portion.

5. The dual-shaft synchronous motion device as claimed in claim 3, wherein the shaft hole corresponds in shape to the pivot ends of the first and second shafts.

6. The dual-shaft synchronous motion device as claimed in claim 5, wherein the pivot ends of the first and second shafts and the shaft hole have a rectangular cross-section.

7. The dual-shaft synchronous motion device as claimed in claim 1, wherein the main portions each have a plug and the secondary portions each have a cavity corresponding in position to the plug to receive the plug so that the main portions and the secondary portions are assembled to form the first rotor and the second rotor.

8. The dual-shaft synchronous motion device as claimed in claim 1, wherein the main portions each have a cavity and the secondary portions each have a plug corresponding in position to the cavity so that the main portions and the secondary portions are assembled to form the first rotor and the second rotor.

9. The dual-shaft synchronous motion device as claimed in claim 1, wherein the tractive member is in the form a flexible wire and has a first end and a second end; the first end of the tractive member is wound and secured to the main body of the first rotor; and the second end of the tractive member is wound and secured to the main body of the second rotor.

10. The dual-shaft synchronous motion device as claimed in claim 2, wherein the tractive member is in the form a flexible wire and has a first end and a second end; the first end of the tractive member is wound and secured to the main body of the first rotor; and the second end of the tractive member is wound and secured to the main body of the second rotor.

11. The dual-shaft synchronous motion device as claimed in claim 3, wherein the tractive member is in the form a flexible wire and has a first end and a second end; the first end of the tractive member is wound and secured to the main body of the first rotor; and the second end of the tractive member is wound and secured to the main body of the second rotor.

12. The dual-shaft synchronous motion device as claimed in claim 1, wherein the first and second ends of the tractive member each have a fixing section; and the fixing section is in the form of a linear section to be received and positioned in the accommodation room defined by the grooves of the main portions and the secondary portions so that the first and second ends of the tractive member are respectively secured to the first rotor and the second rotor.

13. The dual-shaft synchronous motion device as claimed in claim 11, wherein the first and second ends of the tractive member each have a fixing section; and the fixing section is in the form of a linear section to be received and positioned in the accommodation room defined by the grooves of the main portions and the secondary portions so that the first and second ends of the tractive member are respectively secured to the first rotor and the second rotor.

14. The dual-shaft synchronous motion device as claimed in claim 1, wherein the tractive member disposed on the first and second rotors has a figure-8 shape.

15. The dual-shaft synchronous motion device as claimed in claim 2, wherein the tractive member disposed on the first and second rotors has a figure-8 shape.

16. The dual-shaft synchronous motion device as claimed in claim 1, wherein the tractive member is wound from the right of the first rotor to the left of the second rotor; and the tractive member is wound back from the right of the second rotor to the left of the first rotor.

17. The dual-shaft synchronous motion device as claimed in claim 2, wherein the tractive member is wound from the right of the first rotor to the left of the second rotor; and the tractive member is wound back from the right of the second rotor to the left of the first rotor.

18. The dual-shaft synchronous motion device as claimed in claim 1, wherein after the first rotor is turned 180 degrees, the length of the tractive member, wound on the first rotor, is at least equal to a half of the periphery of the first rotor.

19. The dual-shaft synchronous motion device as claimed in claim 2, wherein after the first rotor is turned 180 degrees, the length of the tractive member, wound on the first rotor, is at least equal to a half of the periphery of the first rotor.

20. The dual-shaft synchronous motion device as claimed in claim 1, wherein after the second rotor is turned 180 degrees, the length of the tractive member, wound on the second rotor, is at least equal to a half of the periphery of the second rotor.

21. The dual-shaft synchronous motion device as claimed in claim 1, wherein the first shaft and the second shaft are mounted in a casing.

22. The dual-shaft synchronous motion device as claimed in claim 2, wherein the first shaft and the second shaft are mounted in a casing.

23. The dual-shaft synchronous motion device as claimed in claim 2, wherein the fixed ends of the first and second shafts cooperate with a fixed seat for the first and second shafts to be fixed to a display module and a machine body module of an electronic article.

24. The dual-shaft synchronous motion device as claimed in claim 1, wherein the first and second rotors and the tractive member in cooperation with a fixture assembly are assembled on the first shaft and the second shaft.

25. The dual-shaft synchronous motion device as claimed in claim 2, wherein the first and second rotors and the tractive member in cooperation with a fixture assembly are assembled on the first shaft and the second shaft.

26. The dual-shaft synchronous motion device as claimed in claim 1, wherein the first shaft drives the first rotor, the tractive member brings the second rotor to turn reversely relative to the first rotor.

27. The dual-shaft synchronous motion device as claimed in claim 2, wherein the first shaft drives the first rotor, the tractive member brings the second rotor to turn reversely relative to the first rotor.

28. The dual-shaft synchronous motion device as claimed in claim 1, wherein the first shaft is turned in the range of 0-180 degrees, and the second shaft is turned synchronously and reversely in the range of 0-180 degrees.

29. The dual-shaft synchronous motion device as claimed in claim 2, wherein the first shaft is turned in the range of 0-180 degrees, and the second shaft is turned synchronously and reversely in the range of 0-180 degrees.

30. The dual-shaft synchronous motion device as claimed in claim 21, wherein the first and second shafts are fixed to a display module and a machine body module of an electronic article, the display module drives the first shaft to turn in the range of 0-180 degrees, and the second shaft and the machine body module are turned synchronously and reversely in the range of 0-180 degrees.

31. The dual-shaft synchronous motion device as claimed in claim 22, wherein the first and second shafts are fixed to a display module and a machine body module of an electronic article, the display module drives the first shaft to turn in the range of 0-180 degrees, and the second shaft and the machine body module are turned synchronously and reversely in the range of 0-180 degrees.

32. The dual-shaft synchronous motion device as claimed in claim 23, wherein the display module drives the first shaft to turn in the range of 0-180 degrees, and the second shaft and the machine body module are turned synchronously and reversely 30 in the range of 0-180 degrees.

* * * * *